United States Patent
Catana et al.

(10) Patent No.: US 12,441,138 B2
(45) Date of Patent: Oct. 14, 2025

(54) PNEUMATIC VEHICLE TIRE HAVING A BELT BANDAGE HAVING AT LEAST ONE BELT PLY

(71) Applicant: Continental Reifen Deutschland GmbH, Hannover (DE)

(72) Inventors: Mihail Catana, Hannover (DE); Daniel De Castro Pinho, Hohenhameln (DE); Thomas Kramer, Herford (DE); Michael Schunack, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 84 days.

(21) Appl. No.: 18/560,647

(22) PCT Filed: Mar. 24, 2022

(86) PCT No.: PCT/DE2022/200057
§ 371 (c)(1),
(2) Date: Nov. 13, 2023

(87) PCT Pub. No.: WO2022/242810
PCT Pub. Date: Nov. 24, 2022

(65) Prior Publication Data
US 2024/0246362 A1     Jul. 25, 2024

(30) Foreign Application Priority Data
May 20, 2021 (DE) ...................... 10 2021 205 127.8

(51) Int. Cl.
*B60C 9/00* (2006.01)
*B60C 9/20* (2006.01)

(52) U.S. Cl.
CPC .......... *B60C 9/0007* (2013.01); *B60C 9/2006* (2013.01); *B60C 2009/0021* (2013.01);
(Continued)

(58) Field of Classification Search
CPC ........ D02G 3/48; D07B 1/0646; D07B 1/062; B60C 9/00; B60C 9/0007; B60C 9/0057;
(Continued)

(56) References Cited

U.S. PATENT DOCUMENTS

| | | | | |
|---|---|---|---|---|
| 5,162,067 A | * | 11/1992 | Miyawaki | ............. B60C 9/0007 57/200 |
| 2017/0073888 A1 | * | 3/2017 | Gallet | .................... D07B 7/022 |

FOREIGN PATENT DOCUMENTS

| | | |
|---|---|---|
| JP | H1088488 A | 4/1998 |
| JP | 2000335206 A | 12/2000 |

(Continued)

OTHER PUBLICATIONS

The International Search Report and the Written Opinion of the International Searching Authority mailed on Jun. 24, 2022 for the PCT Application No. PCT/DE2022/200057 which this application claims priority.

(Continued)

*Primary Examiner* — Cedrick S Williams
(74) *Attorney, Agent, or Firm* — Richard A. Wolf; Gregory Adams

(57) ABSTRACT

A pneumatic vehicle tire with a belt assembly with at least one belt ply reinforced with steel cords embedded in rubber material. The steel cords each having the same number of steel filaments, are arranged parallel to one another and at at least substantially equal distances apart within each belt ply, have rubber coating layers on both sides, the layer thicknesses of which in total are 0.10 mm to 2.00 mm, when viewed in cross section are flattened open steel cords composed of four to six steel filaments periodically twisted together, at least two of which, when viewed in cross section, are flat-deformed, have a first larger diameter and a second smaller diameter perpendicular thereto, the ratio of which is between 1.10 and 3.00, and are embedded in the (Continued)

belt ply with their first, larger diameter lying largely flat and are at largely equal clear distances from one another, which are 0.10 mm to 1.00 mm.

16 Claims, 1 Drawing Sheet

(52) U.S. Cl.
CPC .............. *B60C 2009/0092* (2013.01); *B60C 2009/2077* (2013.01)

(58) Field of Classification Search
CPC ........... B60C 9/18; B60C 9/20; B60C 9/2003; B60C 9/2006; B60C 2009/0021; B60C 2009/0092; B60C 2009/2012; B60C 2009/2061; B60C 2009/2077; B60C 2009/2083; B60C 2009/2096; B60C 2009/2238; B60C 2009/2257
See application file for complete search history.

(56) References Cited

FOREIGN PATENT DOCUMENTS

| | | | |
|---|---|---|---|
| JP | 2006328557 A | | 12/2006 |
| KR | 2002003620 A | * | 1/2002 ............. D07B 1/062 |
| KR | 20100128681 A | | 12/2010 |
| KR | 101019719 B1 | | 3/2011 |
| KR | 101385138 B1 | | 4/2014 |

OTHER PUBLICATIONS

EP examination Report dated Aug. 12, 2025 of counterpart European Application No. 22 716 331.8.

* cited by examiner

PNEUMATIC VEHICLE TIRE HAVING A BELT BANDAGE HAVING AT LEAST ONE BELT PLY

CROSS-REFERENCE TO RELATED APPLICATIONS

The present application is a National Stage Application under 35 U.S.C. § 371 of International Patent Application No. PCT/DE2022/200057 filed on Mar. 24, 2022, which claims priority from German Patent Application No. 10 2021 205 127.8 filed on May 20, 2021, each of which is herein incorporated by reference in its entirety.

TECHNICAL FIELD

The invention relates to a pneumatic vehicle tire with a belt assembly with at least one belt ply, which is reinforced with steel cords embedded in rubber material, each having the same number of steel filaments.

BACKGROUND

Belt plies in pneumatic vehicle tires are essential components for the durability of pneumatic vehicle tires, in particular, they ensure the stability of the tires when driving straight ahead and when cornering, even at high speeds. As a result of the steel cords, belt plies contribute significantly to the overall weight of the tires, while the lowest possible tire weight is desired with regard to the rolling resistance of the tires. The steel cords in belt plies of pneumatic vehicle tires also have to meet a series of requirements, for example, and depending on the type of tire, high tensile strength and bending stiffness, high fatigue resistance and corrosion resistance. It is already known, for example from KR 101019719 B1, to strengthen belt plies with flat steel cords composed of three to nine steel filaments and with an open structure in order to reduce the thickness of the belt plies and thus to achieve a reduction in the tire weight by reducing the rubber material. It has also been recognized here that belt plies with flat steel cords have a higher bending stiffness in the lateral direction, while the bending stiffness in the radial direction of the tire is comparatively lower. Tires with such belt plies therefore have improved driving comfort and high stability, which is advantageous when cornering, for instance. The open structure of the steel cords ensures good penetration of the rubber compound between the individual filaments, thereby reducing fatigue effects and reducing the so-called fretting phenomenon.

SUMMARY

The object of the invention is to optimize the balance in a pneumatic vehicle tire between the stability of the belt assembly and a low weight in order to reduce the rolling resistance and at the same time ensure a high durability of the tires.

The stated object is achieved by a pneumatic vehicle tire with at least one belt ply, which is reinforced with steel cords, which
- are arranged parallel to one another and at at least substantially equal distances apart within each belt ply,
- have rubber coating layers on both sides, the layer thicknesses of which in total are 0.10 mm to 2.00 mm,
- when viewed in cross section are flattened open steel cords composed of four to six steel filaments periodically twisted together, at least two of which, when viewed in cross section, are flat-deformed, in particular in an irregular manner,
- have a first larger diameter and a second smaller diameter perpendicular to it, the ratio of which is between 1.10 and 3.00,
- are embedded in the belt ply with their first, larger diameter lying largely flat and
- are at largely equal clear distances from one another, which are 0.10 mm to 1.00 mm.

Pneumatic vehicle tires with at least one belt ply designed in this way have a particularly good balance between the aforementioned characteristics. In pneumatic vehicle tires designed according to the invention, flat steel cords are embedded in at least one belt ply, preferably in all the belt plies, the small clear distance between the steel cords ensuring a high stability of the belt assembly. The particularly small layer thicknesses of the rubber coating layers result in a noticeable reduction of the tire weight and therefore a lower rolling resistance compared to tires with belt constructions with similar strength properties, which are however reinforced with steel cords that are composed of a number of cross-sectionally circular steel filaments and embedded in the belt plies in any orientation.

In pneumatic vehicle tires designed according to the invention, therefore, at least one of the belt plies, in particular all the belt plies (with the exception of a possible belt bandage), are reinforced with flattened steel cords. These flattened steel cords contain at least two steel filaments that are unevenly flattened or irregularly flat or compressed into a non-circular form. The steel cords therefore have two or more deformed steel filaments, depending on the point where a cross section is carried out, it also being possible for all the steel filaments to be deformed.

The deforming or compressing is preferably performed in such a way that, when viewed in any cross section along the steel cords, preferably at least one steel filament is cross-sectionally circular, that is to say is not deformed at the location concerned. Therefore, not all the steel filaments have to be deformed or compressed to provide a "flat" steel cord.

In an embodiment of the steel cords with five steel filaments preferably at least three, in an embodiment of the steel cords with six steel filaments preferably at least four steel filaments are flat-deformed, in particular in an irregular manner.

The steel cords are therefore flattened overall in such a way that the belt ply reinforced with them has a particularly advantageous ratio of the higher bending stiffness in the lateral direction to the lower bending stiffness in the radial direction of the tire.

Particularly preferred is a configuration in which, when viewed in any cross section along the steel cords, in an embodiment of the steel cords with five steel filaments exactly one of the steel filaments is circular, in an embodiment of the steel cords with four or six steel filaments exactly two steel filaments are circular.

In a further configuration, the following relationship applies to the steel cords in the belt ply:

$$D_1 = 100/epdm - R_g,$$

where $D_1$ is the larger diameter of the steel cords and $D_1 > 0.20$ mm, in particular $\geq 0.26$ mm,
$R_g$ is the clear distance between adjacent steel cords and epdm is the number of cords per 10 cm of belt ply width. Such mutual coordination of these parameters is particularly advantageous to ensure a high stability of the belt ply or the belt assembly and thus to ensure a long service life of the tire.

It is also of particular advantage if the ratio of the larger diameter to the smaller diameter of the steel cords is 1.20 to 1.90, in particular 1.40 to 1.80. This ratio is determined by the extent of the deformation of the original cord composed of cross-sectionally circular steel filaments, the specified diameter ratios resulting in steel cords that can withstand a high breaking force, which also ensure a high tensile strength of the belt ply.

Particularly preferred is also an embodiment of the belt ply in which the layer thicknesses of the rubber coating layers in total are 0.20 mm up to 1.00 mm, in particular up to 0.70 mm and preferably up to 0.60 mm. The smaller the layer thicknesses of the rubber coating layers, the higher their advantageous effect on the overall weight of the tire and thus on the rolling resistance. Larger rubber coating layer thicknesses, which in total range from 0.50 mm to 1.00 mm, in special cases even up to 2.00 mm, are provided in tires for trucks or buses, in tires for agricultural vehicles/ machines, earthmoving machines and vehicles for material handling.

The layer thicknesses of the rubber coating layers may in this case be the same size or of different sizes, their minimum thickness being at least 0.05 mm in each case. Preferably, the radially outer layer thickness is the greater here in order to provide better protection against penetration of objects.

Furthermore, particularly preferred is an embodiment of the pneumatic vehicle tire in which at least one belt ply contains flattened steel cords composed of five steel filaments, so that the proportion of steel in the belt ply is relatively low, which is advantageous for the tire weight. In addition, belt plies reinforced with steel cords of this kind can be used to optimize the balance between the stability of the belt assembly and a low tire weight particularly well.

In the case of pneumatic vehicle tires for passenger cars, it is advantageous in this context if the belt ply contains flattened steel cords composed of five steel filaments and with a larger diameter of 0.50 to 0.70 mm, with the clear distance between the steel cords being 0.35 mm to 0.70 mm. The ratio of the larger diameter of the steel cords to the smaller diameter of the steel cords, which, as already mentioned, is determined by the extent of the deformation, is preferably 1.40 to 1.60 in the case of such steel cords, in particular 1.50.

In the case of pneumatic vehicle tires subject to greater loads during operation, such as pneumatic vehicle tires for heavy-duty vehicles, light trucks, buses and the like, it is preferred if the belt ply contains flattened steel cords composed of five steel filaments and with a larger diameter>0.50 mm to 1.35 mm, with the clear distance between the steel cords being 0.50 mm to 0.90 mm. In this variant, it is of advantage if the ratio of the larger diameter to the smaller diameter of the steel cords is 1.70 to 1.80.

The flattened steel cords are preferably produced by deforming steel cords of cross-sectionally circular steel filaments with matching diameters of 0.18 mm to 0.45 mm, in particularly preferred embodiments by deforming steel cords of cross-sectionally circular steel filaments with diameters of 0.185 mm, 0.20 mm, 0.22 mm, 0.28 mm or 0.40 mm.

In particularly preferred embodiments, the flattened steel cords are also produced by deforming steel cords of cross-sectionally circular steel filaments with diameters of 0.18 mm to 0.45 mm, the relationship for the deformed, flattened steel cords being:

$1.60d \leq D_2 \leq 2.40d$, where d is the diameter of the circular steel filaments of the undeformed steel cords and $D_2$ is the smaller diameter of the deformed, flattened steel cords.

BRIEF DESCRIPTION OF THE DRAWINGS

Further features, advantages and details of the invention are now described in more detail on the basis of the drawing, which shows exemplary embodiments and in which.

DETAILED DESCRIPTION

The present invention is concerned with the arrangement of flattened, cross-sectionally non-circular steel cords composed of four to six steel filaments in at least one of the belt plies of pneumatic vehicle tires of a radial design and of any type, preferably tires for passenger cars, light trucks or heavy-duty vehicles.

All dimensions specified in the description should be understood taking into account the usual production-related deviations.

The four to six steel filaments of the flattened steel cords are periodically twisted together or intertwined, so that an open steel cord is present in such a way that, when embedding the steel cords in a belt rubber coating compound, the material of the compound can penetrate into the gaps between the steel filaments, thereby filling them. Individual steel filaments may in this case also contact one another without affecting the penetrability. The steel filaments of the flattened steel cords have a common tensile strength of 2,500 $N/mm^2$ to 4,500 $N/mm^2$, the tensile strengths are therefore substantially in the range from NT (Normal Tensile) to UT (Ultra Tensile).

Figure 1:
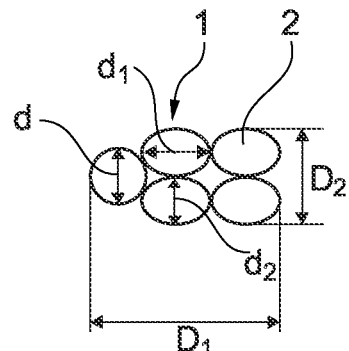
FIG. 1 shows a schematic cross section of a variant of an embodiment of a flattened steel cord composed of five steel filaments.
Figure 2:
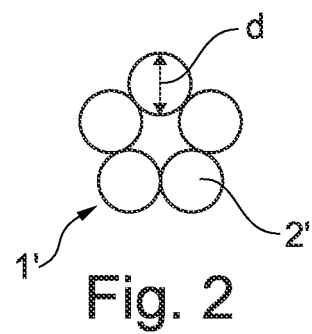
FIG. 2 shows a schematic cross section of a non-flattened steel cord composed of five cross-sectionally circular steel filaments.
Figure 3:
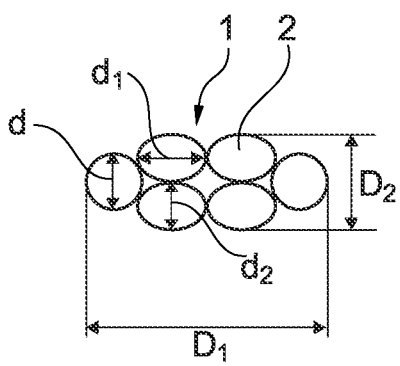
FIG. 3 shows a schematic cross section of a further variant of an embodiment of a flattened steel cord composed of six steel filaments.
Figure 4:
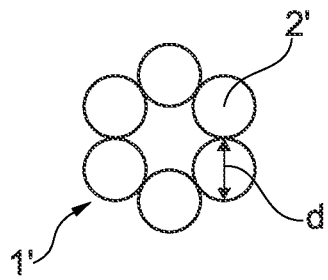
FIG. 4 shows a schematic cross section of a non-flattened steel cord composed of six cross-sectionally circular steel filaments.
Figure 5:
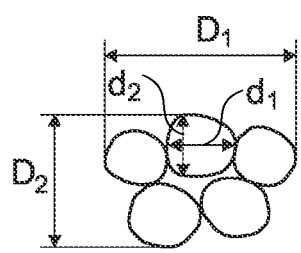
FIG. 5 shows a realistic cross section of a flattened steel cord composed of five steel filaments and FIG. 6 shows a schematic cross section of a portion of a belt ply of a pneumatic vehicle tire with embedded, flattened and schematically shown steel cords composed of five steel filaments.

FIG. 1 shows a schematic cross section of a flattened steel cord 1 with five steel filaments 2, FIG. 3 shows a schematic cross section of a flattened steel cord 1 with six steel filaments 2. The production of the flattened steel cords 1 is performed in such a way that five or up to six steel filaments 2' of the same design and circular in cross section, with a diameter d of 0.10 mm to 0.60 mm, in particular of 0.18 mm to 0.45 mm, are twisted together so that the steel cords 1', that are round in cross section in FIG. 2 and FIG. 4 are formed as "original cords". These "original cords" are deformed, for example by a rolling operation, so that in each case at least two steel filaments 2' are locally flattened or deformed, in particular in the region of their mutual contact points, and an irregularly flattened cross-sectional form is thereby at least partially obtained, with also the steel cord 1 being given overall a flattened cross-sectional shape. Due to the twisting of the steel filaments 2, when viewed in different cross sections over the length of the steel cord 1, steel filaments 2 are differently deformed; some may even not be deformed and then locally have their originally circular cross section. FIG. 5 shows this on the basis of a representation of a realistic cross section of a flattened steel cord 1 with five largely irregularly deformed steel filaments 2. The same applies to flattened steel cords composed of four steel filaments.

The flattened steel cords 1 have a larger diameter $D_1$ and a diameter $D_2$ at right angles to it, smaller compared to $D_1$. The diameters $D_1$ and $D_2$ are the largest diameters in each case and are therefore determined at the locations with the largest "widths" of the steel cords 1. $D_1$ is in this case $>0.2$ mm, in particular $D_1 > 0.26$ mm, and the ratio of $D_1$ to $D_2$ is 1.10 to 3.00, preferably 1.20 to 1.90, particularly preferably 1.40 to 1.80. For the deformed, flattened steel cords 1, the relationship $1.60\ d \leq D_2 \leq 2.40\ d$ applies with respect to the smaller diameter $D_2$, where d is the diameter of the cross-sectionally circular steel filaments of the undeformed steel cords. The deformation or compression of the "original cords" is performed in particular in such a way that the deformed steel filaments 2 have their largest diameter $d_1$ substantially parallel to the diameter $D_1$ and a further smaller diameter $d_2$ at right angles to it at its widest point, where the ratio of $d_2$ to $d_1$ is in the range of about 0.70 to about 0.98.

The flat-deformed steel filaments 2 each have a cross-sectional surface area which corresponds or largely corresponds to that of the originally circular steel filaments 2, because minor material shifts in the longitudinal direction of the steel filaments can take place locally in the deformation process.

Figure 6:
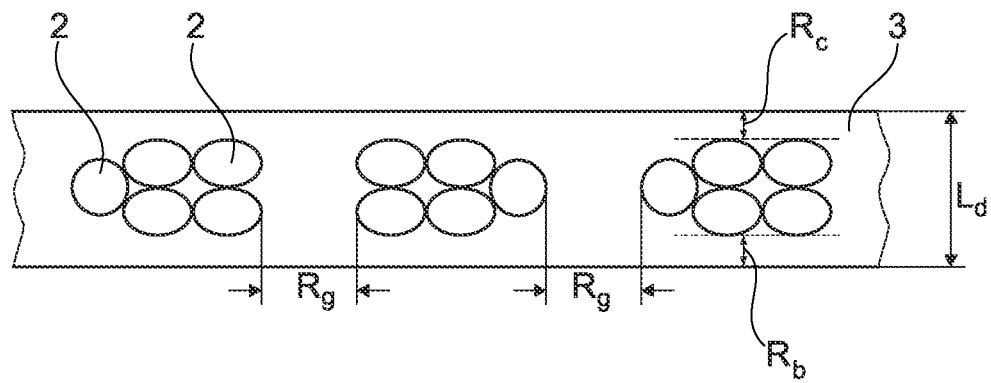

FIG. 6 shows by way of example a cross section through a portion of a belt ply 3 of a pneumatic vehicle tire, the belt ply 3 being reinforced with schematically shown steel cords 1 with five steel filaments 2. Instead of the steel cords composed of five filaments shown, as described, steel cords of four or six filaments may also be contained in the belt ply 3. The clear distance $R_g$ between the steel cords 1 depends on the diameter $D_1$ and the cord density (epdm, number of cords per decimeter belt ply) and ranges between 0.10 mm, in particular 0.30 mm, and 1.00 mm, where:

$$D_1 = 100/epdm - R_g, \text{ where } D_1 > 0, 2 \text{ mm, as mentioned above.}$$

If, according to a preferred embodiment, the flattened steel cords have five steel filaments and a diameter $D_1$ of 0.50 mm to 0.70 mm, the clear distance $R_g$ between the steel cords is 0.35 mm to 0.70 mm. If the diameter $D_1$ of the flattened steel cords is $>0.50$ mm to 1.35 mm, the steel cords 1 are embedded in the belt ply 3 in such a way that their clear distance $R_g$ apart is 0.50 mm to 0.90 mm.

The overall thickness La of the belt ply 3 is the sum of the aforementioned smaller diameter $D_2$ of the steel cords 1 contained in the belt ply 3 and the layer thicknesses $R_c$ and $R_b$ of the rubber coating layers present above and below the steel cords 1. The layer thicknesses $R_c$ and $R_b$ are in each case determined as the smallest clear distances between the steel cords 1 and the outer and inner outer surfaces of the belt ply 3. The sum of the two layer thicknesses $R_c$ and $R_b$ for flattened steel cords composed of four to six steel filaments is at least 0.10 mm and at most 2.00 mm, in particular up to 1.00 mm, preferably up to 0.70 mm, particularly preferably up to 0.60 mm. $R_c$ and $R_b$ may be the same size (on average) or of different sizes, so that there is an asymmetric rubber coating. A preferred range for the sum of $R_c$ and $R_b$ lies in the range from 0.20 mm to 0.60 mm.

Table 1, Table 2 and Table 3 contain data on preferred variants VAR1.1, VAR1.2, VAR2.1, VAR 2.2, VAR3 and VAR4 of an embodiment of belt plies with flattened steel cords 1 composed of five steel filaments 2 and comparative examples REF1.1, REF1.2, REF2 and REF3 of belt plies with steel cords that are known steel cords made according to the prior art. REF1.1 is the comparative example for the variants VAR1.1 and VAR2.1; REF1.2 is the comparative example for the variants VAR1.2 and VAR2.2. REF2 is the comparative example for the variant VAR3, and REF3 is the comparative example for the variant VAR4.

The comparative examples REF1.1, REF1.2, REF2 and REF3 contain steel cords of the constructions 2×0.30 mm HT, 2+2×0.32 mm HT and 3×0.2 mm+6×0.35 mm HT with cross-sectionally circular steel filaments.

The steel cords in the belt plies made according to the invention (VAR1.1 to VAR4) are flattened steel cords, for which, in the absence of better terminology, the originally circular diameter of the steel filaments is indicated in the steel cord construction; therefore 0.185 mm (construction referred to as 5×1.85 mm ST), also 0.20 mm (construction referred to as 5×0.20 mm ST), 0.28 mm (construction referred to as 5×0.28 mm ST) and 0.40 mm (construction referred to as 5×0.40 mm ST).

Other parameters in the tables are the cord diameter (REF1.1 to REF3), the diameter $D_1$, the diameter $D_2$, the ratio $D_1$ to $D_2$, the breaking force that can be withstood by the respective steel cord, determined according to ASTM D2969 and ASTM D4975, the tensile strength of the belt ply in kN/dm (calculated from the epdm and the breaking force that can be withstood by the respective cord), the belt thickness in mm, the clear distance between cords $R_g$ in mm and the number of cords per 10 cm of belt ply (epdm).

In the comparative examples REF1.1 to REF3, the belt ply weight is set to 100%, in the examples according to the invention VAR1.1 to VAR4 respectively in % and in relation to the respective comparative examples REF1.1 to REF3.

TABLE 1

|  | REF1.1 | REF1.2 | VAR1.1 | VAR1.2 | VAR2.1 | VAR2.2 |
|---|---|---|---|---|---|---|
| Cord construction | 2 × 0.30 mm HT | | 5 × 0.185 mm ST | | 5 × 0.20 mm ST | |
| Cord diameter [mm] | 0.60 | 0.60 | | | | |
| Diameter $D_1$ [mm] | | | 0.60 | 0.60 | 0.66 | 0.66 |
| Diameter $D_2$ [mm] | | | 0.40 | 0.40 | 0.44 | 0.44 |
| Ratio of $D_1$ to $D_2$ | | | 1.5 | 1.5 | 1.5 | 1.5 |
| Breaking force (N) | 445 | 445 | 460 | 460 | 505 | 505 |
| Tensile strength [kN/dm] | 35.6 | 42.3 | 36.8 | 43.7 | 40.4 | 48.0 |
| Clear distance between cords $R_g$ [mm] | 0.65 | 0.45 | 0.65 | 0.45 | 0.59 | 0.39 |

TABLE 1-continued

|  | REF1.1 | REF1.2 | VAR1.1 | VAR1.2 | VAR2.1 | VAR2.2 |
|---|---|---|---|---|---|---|
| Belt ply weight [%] | 100.0% | 100.0% | 85.0% | 85.7% | 87.6% | 88.1% |
| Belt ply thickness [mm] | 0.90 | 0.90 | 0.70 | 0.70 | 0.74 | 0.74 |
| epdm | 80 | 95 | 80 | 95 | 80 | 95 |

TABLE 2

|  | REF2 | VAR3 |
|---|---|---|
| Cord construction | 2 + 2 × 0.32 mm HT | 5 × 0.28 mm ST |
| Cord diameter [mm] | 0.83 |  |
| Diameter $D_1$ [mm] |  | 0.94 |
| Diameter $D_2$ [mm] |  | 0.53 |
| Ratio of $D_1$ to $D_2$ |  | 1.77 |
| Breaking force (N) | 1010 | 980 |
| Tensile strength [kN/dm] | 65.7 | 63.7 |
| Clear distance between cords $R_g$ [mm] | 0.71 | 0.60 |
| Belt ply weight [%] | 100.0% | 79.0% |
| Belt ply thickness [mm] | 1.30 | 0.83 |
| epdm | 65 | 65 |

TABLE 3

|  | REF3 | VAR4 |
|---|---|---|
| Cord construction | 3 × 0.2 mm + 6 × 0.35 mm HT | 5 × 0.40 mm ST |
| Cord diameter [mm] | 1.13 |  |
| Diameter $D_1$ [mm] |  | 1.30 |
| Diameter $D_2$ [mm] |  | 0.75 |
| Ratio of $D_1$ to $D_2$ |  | 1.74 |
| Breaking force (N) | 1980.0 | 1931.7 |
| Tensile strength [kN/dm] | 81.2 | 90.8 |
| Clear distance between cords $R_g$ [mm] | 1.31 | 0.83 |
| Belt ply weight [%] | 100.0% | 86.1% |
| Belt ply thickness [mm] | 1.60 | 1.05 |
| epdm | 41 | 47 |

LIST OF REFERENCE SIGNS 1, 1' . . . . . . . . . . . . . . . . Steel cord
2, 2' . . . . . . . . . . . . . . . . Steel filament
3 . . . . . . . . . . . . . . . . . . . . . Belt ply
$R_g$ . . . . . . . . . . . . . . . . . . . Distance
$R_c$, $R_b$ . . . . . . . . . . . . Rubber coating layer thicknesses
$D_1$, $D_2$ . . . . . . . . . . . . Diameter of steel cord
$d_1$, $d_2$ . . . . . . . . . . . . . Diameter of steel filament
d . . . . . . . . . . . . . . . . . . . . . Diameter of steel filament
$L_d$ . . . . . . . . . . . . . . . . . . Overall thickness of the belt ply

The invention claimed is:

1. A pneumatic vehicle tire comprising a belt assembly having at least one belt ply which is reinforced with steel cords embedded in rubber material, each of the steel cords having the same number of steel filaments, in which the steel cords:
are arranged parallel to one another and at at least substantially equal distances apart within the at least one belt ply,
have rubber coating layers on both sides, the layer thicknesses of which in total are 0.10 mm to 2.00 mm,
when viewed in cross section are flattened open steel cords composed of four to six steel filaments periodically twisted together, at least two of which, when viewed in cross section, are flat-deformed,
have a first larger diameter and a second smaller diameter perpendicular thereto, the ratio of the first diameter to the second diameter is between 1.10 and 3.00,
are at equal distances from one another, which the equal distances are from 0.10 mm to 1.00 mm
wherein the steel filaments, when viewed in cross-section, are flat deformed in a random irregular manner to lack symmetry and uniformity within each filament and with respect to each other.

2. The pneumatic vehicle tire as claimed in claim 1, wherein the following relationship applies to the steel cords in the belt ply:

$$D1 = 100/epdm - Rg,$$

where D1 is the first larger diameter of the steel cords, Rg is the clear distance between adjacent steel cords, and
epdm is the number of cords per 10 cm of belt ply width,
wherein the steel cords consist of five steel filaments all flat-deformed in the random irregular manner,
wherein D1 is greater than 0.50 mm to 1.35 mm, with the clear distance between the steel cords being 0.50 mm to 0.90 mm,
wherein the ratio (D1/D2) of the larger diameter (D1) to the smaller diameter (D2) of the steel cords is 1.20 to 1.90, and
wherein the layer thicknesses of the rubber coating layers in total are 0.20 mm to 1.00 mm.

3. The pneumatic vehicle tire as claimed in claim 1, wherein the flattened steel cords are produced by deforming steel cords of cross-sectionally circular steel filaments with diameters of 0.18 mm to 0.45 mm to thereby provide the steel filaments flat deformed in the random irregular manner, the relationship for the deformed, flattened steel cords being:

$$1.60d \leq D2 \leq 2.40d,$$

where d is the diameter of the cross-sectionally circular steel filaments of the undeformed steel cords and D2 is the smaller diameter of the flat deformed steel cords.

4. The pneumatic vehicle tire as claimed in claim 1, wherein the flattened steel cords are produced by deforming steel cords of cross-sectionally circular steel filaments with diameters of 0.185 mm, 0.20 mm, 0.22 mm, 0.28 mm or 0.40 mm to thereby provide the steel filaments flat deformed in the random irregular manner.

5. The pneumatic vehicle tire as claimed in claim 1, wherein the flattened steel cords are produced by deforming steel cords of cross-sectionally circular steel filaments with matching diameters of 0.18 mm to 0.45 mm to thereby provide the steel filaments flat deformed in the random irregular manner.

6. The pneumatic vehicle tire as claimed in claim 1, wherein the layer thicknesses of the rubber coating layers are the same size or of different sizes, the layer thicknesses being at least 0.05 mm in each case.

7. The pneumatic vehicle tire as claimed in claim 1, wherein the layer thicknesses of the rubber coating layers in total are 0.20 mm to 1.00 mm.

8. The pneumatic vehicle tire of claim 7, wherein the layer thicknesses of the rubber coating layers in total are 0.20 mm to 0.70 mm.

9. The pneumatic vehicle tire as claimed in claim 1, wherein the ratio (D1/D2) of the larger diameter (D1) to the smaller diameter (D2) of the steel cords is 1.20 to 1.90.

10. The pneumatic vehicle tire as claimed in claim 9, wherein the ratio of the larger diameter to the smaller diameter of the steel cords is 1.70 to 1.80.

11. The pneumatic vehicle tire of claim 9, wherein the ratio (D1/D2) of the larger diameter (D1) to the smaller diameter (D2) of the steel cords is 1.40 to 1.80.

12. The pneumatic vehicle tire as claimed in claim 1, wherein the following relationship applies to the steel cords in the belt ply:

$$D1 = 100/epdm - Rg,$$

where D1 is the first larger diameter of the steel cords and D1>0.20 mm, and where Rg is the clear distance between adjacent steel cords and epdm is the number of cords per 10 cm of belt ply width.

13. The pneumatic vehicle tire as claimed in claim 12 wherein the belt ply contains flattened steel cords composed of five steel filaments and with a larger diameter of 0.50 mm to 0.70 mm, with the clear distance between the steel cords being 0.35 mm to 0.70 mm.

14. The pneumatic vehicle tire as claimed in claim 12, wherein the ratio of the larger diameter to the smaller diameter of the steel cords is 1.40 to 1.60.

15. The pneumatic vehicle tire as claimed in claim 12, wherein the belt ply contains flattened steel cords composed of five steel filaments and with the larger diameter>0.50 mm to 1.35 mm, with the clear distance between the steel cords being 0.50 mm to 0.90 mm.

16. The pneumatic vehicle tire of claim 12, where D1>0.26 mm.

* * * * *